(12) United States Patent
Gao et al.

(10) Patent No.: US 8,416,530 B2
(45) Date of Patent: Apr. 9, 2013

(54) WRITE HEAD WITH BEVEL STRUCTURE AND REVERSE NFT FOR HAMR

(75) Inventors: Kaizhong Gao, Eden Prairie, MN (US); Xuhui Jin, Fremont, CA (US); Arkadi Goulakov, Edina, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 755 days.

(21) Appl. No.: 12/582,236

(22) Filed: Oct. 20, 2009

(65) Prior Publication Data

US 2011/0090588 A1  Apr. 21, 2011

(51) Int. Cl.
- *G11B 11/24* (2006.01)
- *G11B 5/127* (2006.01)
- *G11B 13/08* (2006.01)
- *G11B 9/12* (2006.01)

(52) U.S. Cl. ............. 360/125.31; 360/59; 360/125.74; 369/13.33

(58) Field of Classification Search .............. 360/59, 360/125.31, 125.74, 128; 369/13.33, 13.02, 369/13.24, 13.32

See application file for complete search history.

(56) References Cited

U.S. PATENT DOCUMENTS

| | | | |
|---|---|---|---|
| 6,795,630 B2 | 9/2004 | Challener et al. | |
| 7,330,404 B2 | 2/2008 | Peng et al. | |
| 7,911,882 B2 * | 3/2011 | Shimazawa et al. | 369/13.33 |
| 2003/0184903 A1 | 10/2003 | Challener | |
| 2004/0001394 A1 | 1/2004 | Challener et al. | |
| 2004/0001420 A1 | 1/2004 | Challener | |
| 2004/0062503 A1 | 4/2004 | Challener | |
| 2004/0240327 A1 | 12/2004 | Sendur et al. | |
| 2005/0052771 A1 | 3/2005 | Rausch et al. | |
| 2005/0135008 A1 | 6/2005 | Challener et al. | |
| 2006/0005216 A1 | 1/2006 | Rausch | |
| 2006/0182393 A1 | 8/2006 | Sendur et al. | |
| 2006/0232869 A1 | 10/2006 | Itagi et al. | |
| 2006/0233061 A1 | 10/2006 | Rausch et al. | |
| 2008/0068748 A1 | 3/2008 | Olson et al. | |
| 2008/0130155 A1 | 6/2008 | Naniwa et al. | |
| 2009/0073843 A1 | 3/2009 | Peng | |
| 2009/0116804 A1 | 5/2009 | Peng et al. | |
| 2010/0214685 A1 * | 8/2010 | Seigler et al. | 360/59 |
| 2011/0286127 A1 * | 11/2011 | Gao et al. | 360/59 |

FOREIGN PATENT DOCUMENTS

| | | | |
|---|---|---|---|
| JP | 2007164936 A | * | 6/2007 |
| JP | 2008269757 A | * | 11/2008 |

OTHER PUBLICATIONS

Challener, W.A., et al., Heat-assisted magnetic recording by a near-field transducer with efficient optical energy transfer, published online Mar. 22, 2009,1-5, Nature Photonics Advance Online Publication.

Ikkawi, R., et al., Near-Field Optical Transducer for Heat-Assisted Magnetic Recording for Beyond-10-Tbit/in2 Densities, Jounral of Nanoelectronics and Optoelectronics, vol. 3, 44-54, 2008.

* cited by examiner

*Primary Examiner* — Will J Klimowicz

(74) *Attorney, Agent, or Firm* — Hall Estill Attorneys at Law

(57) ABSTRACT

A magnetic recording head comprises a write pole tip adjacent to an air bearing surface and a return pole. In addition, a near field transducer is positioned adjacent the write pole in order to produce near field radiation to heat a portion of a recording medium to facilitate switching by the magnetic write pole. The near field transducer is a reverse optical near field transducer with internal bevel structures that enhance the magnetic write field intensity.

20 Claims, 10 Drawing Sheets

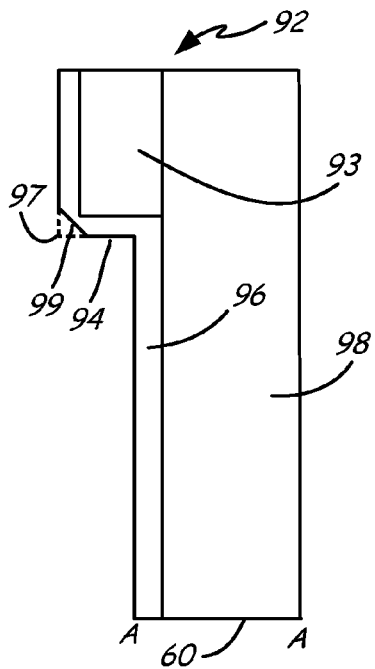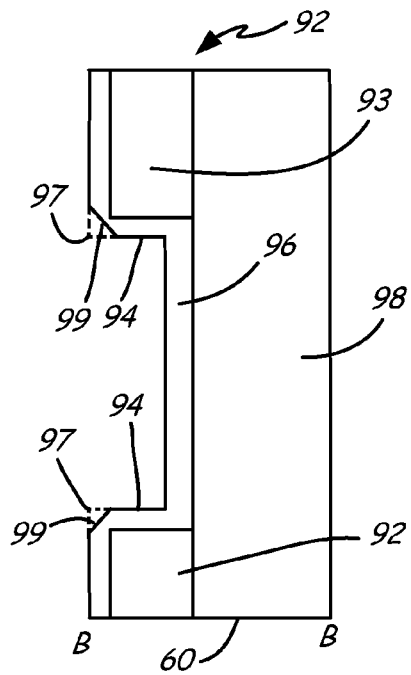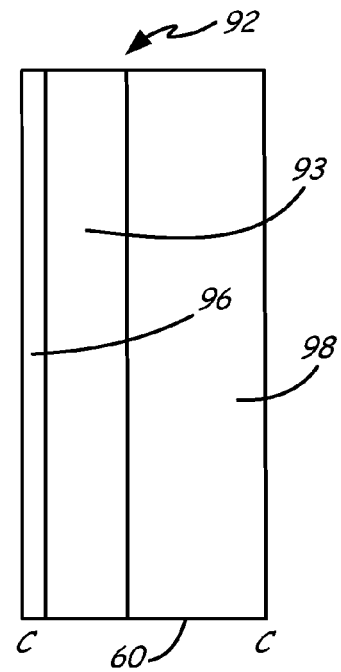
FIG. 7A   FIG. 7B   FIG. 7C
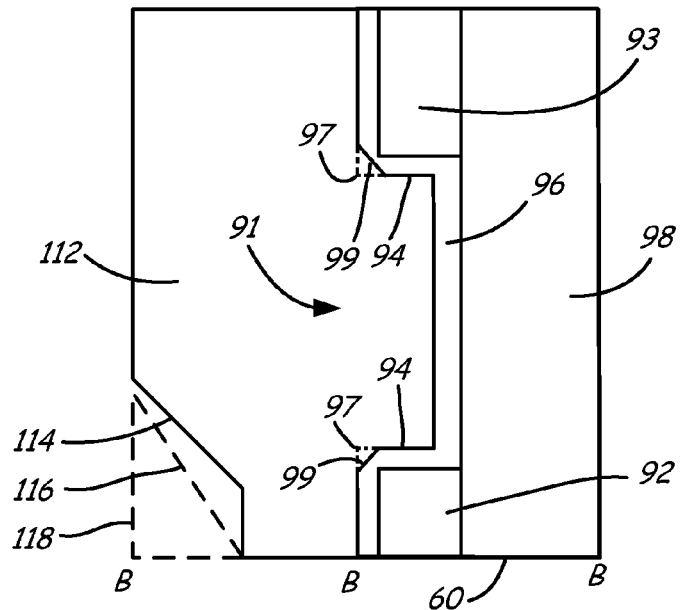
FIG. 7D

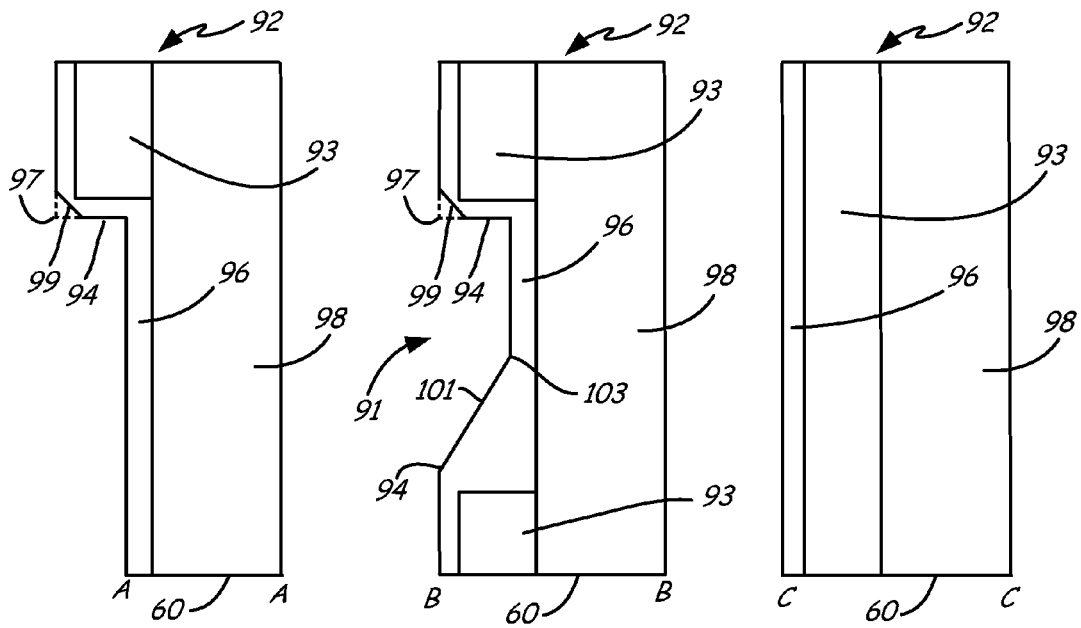
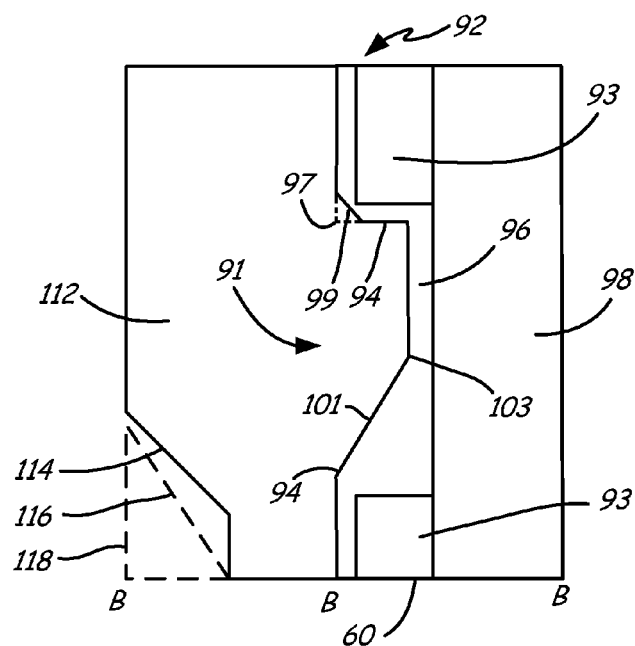

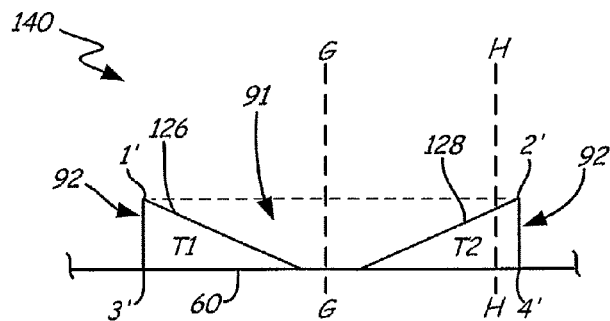
FIG. 11A
FIG. 11B  FIG. 11C  FIG. 11D  FIG. 11E
Prior Art
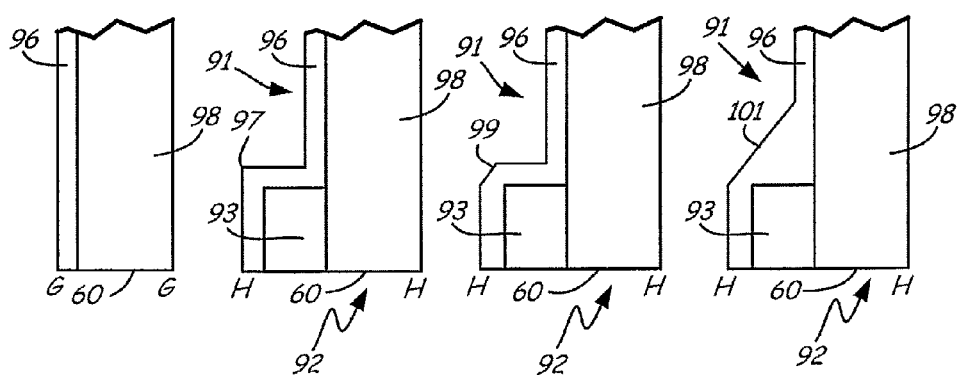
FIG. 11F
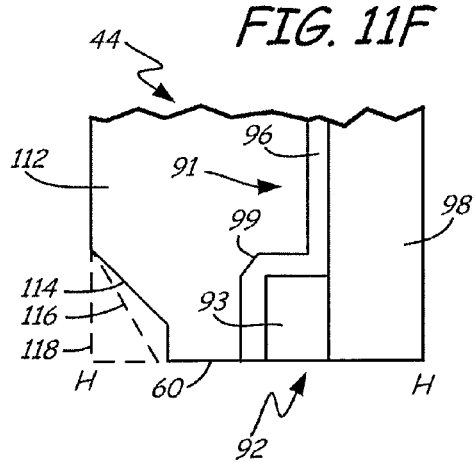
FIG. 11G
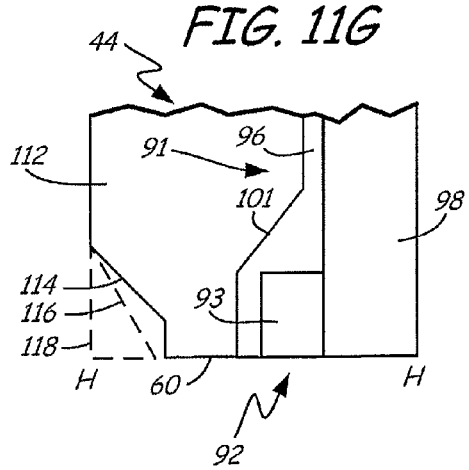

WRITE HEAD WITH BEVEL STRUCTURE AND REVERSE NFT FOR HAMR

BACKGROUND

In response to increased demand for higher magnetic storage capacity, areal bit densities approaching 1 TB/in² are being contemplated. The bit size of sub 50 nm required to fulfill this goal is within a range where superparamagnetic instabilities affect the lifetime of stored data. Superparamagnetic instabilities become an issue as the grain volume (i.e., the number of grains per bit cell) of the recording media is reduced in order to increase the tracking density of recorded information. The superparamagnetic effect is most evident when the grain volume V is sufficiently small that the inequality $K_u V/k_B T > 70$ can no longer be maintained. $K_u$ is the magnetocrystalline anisotropy energy density of the material, $k_B$ is Boltzmann's constant, and T is absolute temperature. When this inequality is not satisfied, thermal energy can demagnetize the stored bits. As the grain size is decreased in order to increase the areal density, a threshold is reached for a given $K_u$ and temperature T such that stable data storage is no longer feasible.

The thermal stability can be improved by employing a recording media formed of a material with a very high $K_u$. However, with available materials, existing recording heads are not able to provide a sufficient or high enough magnetic writing field to write on such a media. Accordingly, it has been proposed to overcome the recording head field limitations by employing thermal energy to heat a localized area on the recording media before or at about the time of applying the magnetic field to write to the media in order to assist in the recording process.

Heat assisted magnetic recording (HAMR) generally refers to the concept of locally heating a recording media to reduce the coercivity. This allows the applied magnetic writing fields to more easily direct the magnetization during the temporary magnetic softening caused by the heat source. HAMR allows for the use of small grain media, with a larger magnetic anisotropy at room temperature to assure sufficient thermal stability, which is desirable for recording at increased areal densities. HAMR can be applied to any type of magnetic storage media including tilted media, longitudinal media, perpendicular media, and patterned media. By heating the media, the $K_u$ or coercivity is reduced such that the magnetic write field is sufficient to write to the media. Once the media cools to ambient temperature, the coercivity has a sufficiently high value to assure thermal stability of the recorded information.

For HAMR, an electromagnetic wave of, for example, visible, infrared, or ultraviolet light can be directed onto a surface of a data storage media to raise the temperature of a localized area to facilitate switching. Well known optical waveguides such as solid immersion lenses (SILs), solid immersion mirrors (SIMs), and mode index lenses have been proposed for use in reducing the size of a spot on the media that is subjected to the electromagnetic radiation. SILs, SIMs, and mode index lenses alone are not sufficient to achieve focal spot sizes necessary for high areal density recording due to diffraction limited optical effects. Metal pins and other near field transducer (NFT) designs positioned at the focal point of the waveguide are used to further concentrate the energy and direct it to a small spot on the surface of the recording medium.

Increasing the optical and magnetic energy flux during HAMR remains a significant challenge. Continuing demand for smaller bit size and higher areal density magnetic recording has forced collocation of the optical and magnetic elements in a HAMR transducer. As a result, the optical elements occupy space previously filled by the magnetic writer pole with the result that the strength of the magnetic writer field is limited.

SUMMARY

A HAMR magnetic recording head comprises a write pole tip adjacent to an air bearing surface and a return pole. In addition, a near field transducer is positioned adjacent the write pole in order to produce near field radiation to heat a portion of the media to facilitate switching by the magnetic write pole. The near field transducer has an insulator layer between the near field transducer and the write pole with beveled edges over discontinuities in the near field transducer that enhance the magnetic writer field intensity.

A magnetic transducer comprises a write pole and a near field transducer that couples with incident electromagnetic radiation to produce surface plasmons at metal/insulator interfaces that provide radiation to heat a recording media adjacent the write pole. The insulator layer has beveled edges over discontinuities in the near field transducer to enhance the electric field intensity on the media.

BRIEF DESCRIPTION OF THE DRAWINGS

FIG. 7A is a cross sectional view of section AA in FIG. 4 after dielectric deposition.

FIG. 7B is a cross sectional view of section BB in FIG. 4 after dielectric deposition.

FIG. 7C is a cross sectional view of section CC in FIG. 4 after dielectric deposition.

FIG. 7D is a cross sectional view of section BB in FIG. 4 after deposition of write pole material over embodiment of FIGS. 6A-6C.

FIG. 8A is a cross sectional view of section AA in FIG. 4 after dielectric deposition in another embodiment.

FIG. 8B is a cross sectional view of section BB of FIG. 4 after dielectric deposition in the embodiment of FIG. 8A.

FIG. 8C is a cross sectional view of section in FIG. 4 after dielectric deposition in the embodiment of FIG. 7A.

FIG. 8D is a cross sectional view of section BB in FIG. 4 after deposition of write pole material over the embodiment of FIGS. 7A-7C.

FIG. 11A is a schematic representation of the top view of an apparatus.

FIG. 11B is a cross sectional view of section GG in FIG. 10A after dielectric deposition.

FIG. 11C is a cross sectional view of section HH in FIG. 10A of a prior art design after dielectric deposition.

FIG. 11D is a cross sectional view of section HH in FIG. 10A after dielectric deposition.

FIG. 11E is a cross sectional view of section HH in FIG. 10A of another embodiment after dielectric deposition.

FIG. 11F is a cross sectional view of section HH in FIG. 10D after deposition of write pole material over the dielectric layer and metal NFT shape.

FIG. 11G is a cross sectional view of section HH in FIG. 10E after deposition of write pole material over the dielectric and metal NFT shape.

DETAILED DESCRIPTION

Figure 1:
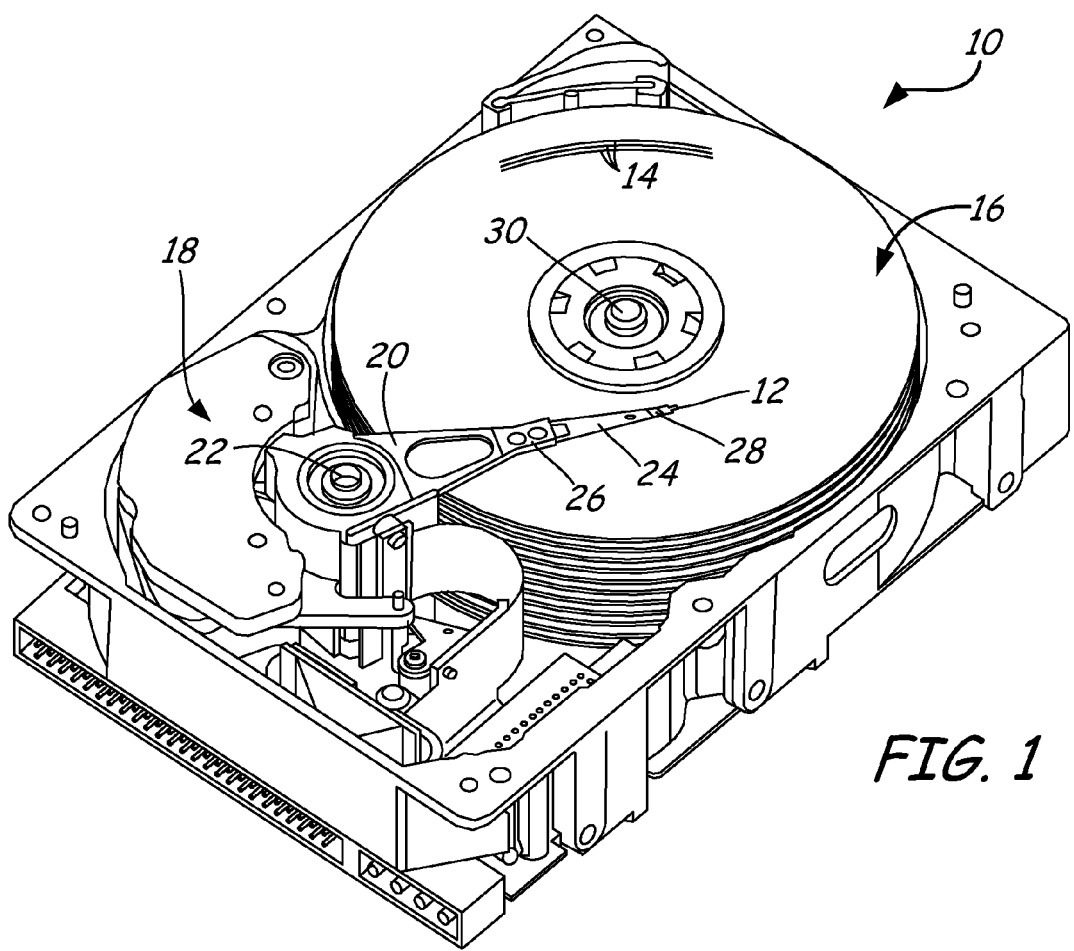
FIG. 1 is a perspective view of a magnetic disc drive that can include HAMR devices.

FIG. 1 is a perspective view of disc drive 10 including an actuation system for positioning slider 12 over track 14 of magnetic medium 16. The particular configuration of disc drive 10 is shown for ease of describing the present invention and is not intended to limit the scope of the present invention in any way. Disc drive 10 includes voice coil motor 18 arranged to rotate actuator arm 20 on a spindle around axis 22. Load beam 24 is connected to actuator arm 20 at head mounting block 26. Suspension 28 is connected to an end of load beam 24 and slider 12 is attached to suspension 28. Magnetic medium 16 rotates around an axis 30, so that the windage is encountered by slider 12 to keep it aloft a small distance above the surface of magnetic medium 16. Each track 14 of magnetic medium 16 is formatted with an array of data storage cells for storing data. Slider 12 carries a magnetic transducer (not shown in FIG. 1) for reading and/or writing data on tracks 14 of magnetic medium 16. The magnetic transducer utilizes additional electromagnetic energy to heat the surface of medium 16 to facilitate recording by a process termed heat assisted magnetic recording (HAMR). The HAMR transducer is described in FIGS. 2-4, 7-9, and 11.

A HAMR transducer includes a magnetic writer for generating a magnetic field to write to a magnetic medium (e.g. magnetic medium 16) and an optical device to heat a portion of the magnetic medium proximate to the write field. In the following description, FIGS. 2 and 3 relate to the components and functionality of a magnetic writer. FIGS. 4 and 6-11G relate to the components and functionality of optical devices. FIGS. 5A and 5B relate to the effect of the design on the function of an optical device.

Figure 2:
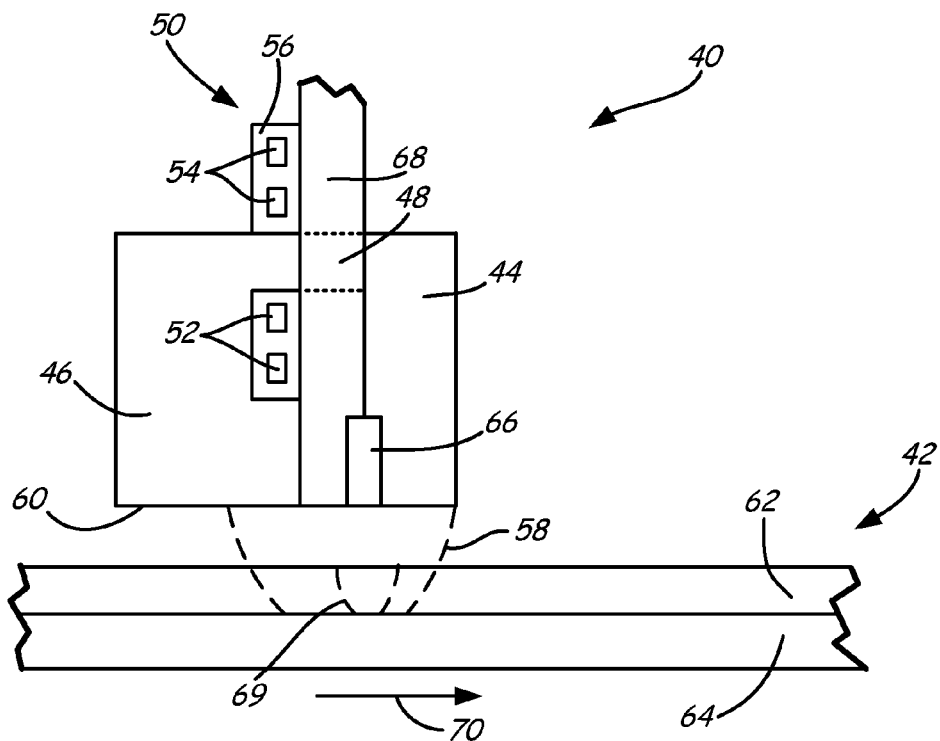
FIG. 2 is a cross sectional view of a perpendicular magnetic recording head and of an associated recording medium.
Figure 3:
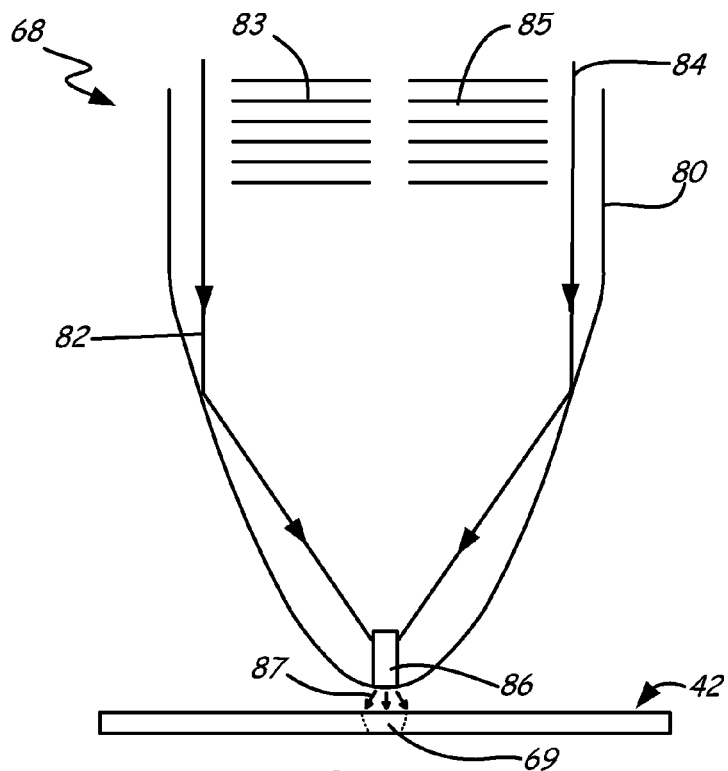
FIG. 3 is a schematic representation of a waveguide and a near field transducer proximate an associated recording medium.

FIG. 2 is a cross sectional view of a portion of magnetic recording head 40 and a portion of associated perpendicular magnetic storage medium 42. Magnetic recording head 40 includes write pole 44 and return pole 46 coupled by pedestal 48. A coil 50 comprising conductors 52 and 54 encircles the pedestal and is supported by an insulator 56. Perpendicular magnetic storage medium 42 comprises magnetically hard storage layer 62 and soft magnetic underlayer 64. A current in coil 50 induces a magnetic field in the pedestal and the poles. Magnetic flux 58 exits the recording head at air bearing surface (ABS) 60 and is used to change the magnetization of portions of magnetically hard layer 62 of storage medium 42 enclosed within region 58. Near field transducer 66 is positioned in write pole 44 proximate air bearing surface 60. Near field transducer 66 is coupled to a waveguide 68 that receives an electromagnetic wave from an external source such as a laser. An electric field at the end of near field transducer 66 is used to heat a portion 69 of magnetically hard layer 62 to lower the coercivity so that the magnetic field from the write pole can affect the magnetization of the storage medium.

HAMR transducers can incorporate various waveguides such as mode index lenses or planar solid immersion mirrors or lenses to generate focused beams. In the example shown in FIG. 3, edge 80 of waveguide 68 is substantially parabolic in shape. If the refractive indices of material exterior to edge 80 are less than the indices of material of waveguide 68, then waveguide 68 acts as a solid immersion lens. Electromagnetic waves 82 and 84 traveling along the longitudinal axis of the lens (waveguide 68) will be deflected at boundary 80 toward focal point 86 as shown. Diffraction gratings 83 and 85 or other means known in the art to couple external energy into waveguide 68 can be configured to minimize radiation traveling down the center of waveguide 68 and maximize the energy reflected from parabolic edge 80, thereby increasing the energy content of the longitudinal component of waves 82 and 84 impinging on the focal point.

In HAMR recording, spot sizes of zones heated by light radiation necessary to maintain acceptable aerial bit densities in recording media need to be less than 100 nm. Conventional focusing waveguides such as tapered waveguides, solid immersion lenses (SIL) and solid immersion mirrors (SIM) produced diffraction limited spots that are not sufficient for the sub 100 nm dimensions required. Near field transducers (NFTs) are required to further focus the energy to acceptable spot sizes. Examples of near field transducers include metallic pins, sphere/pin and disk/pin combinations.

The dimensions of the spot concentrated at focal point 86 of waveguide 68 are diffraction limited and are not sufficient for the sub 100 nm dimensions required for high areal density HAMR recording media. Near field transducers (NFTs) are required to focus the energy to acceptable sub 100 nm spot sizes. Near field transducer 66 positioned at focal point 86 of waveguide 68 in FIG. 3 can couple with incident waves 82 and 84 to generate surface plasmons that propagate axially down NFT 66 until they exit as evanescent energy schematically shown as arrows 87 that heat a small region 69 of recording media 42.

Waveguide 68 can be made of, for example, a high index dielectric core material like $TiO_2$, $Ta_2O_5$, Si, SiN, or ZnS depending on the wavelength and refractive index desired. For example, Si has a very large index of 3.5 at a wavelength of 1550 nm in the near infrared, but it is not transparent to visible light. $Ta_2O_5$ has a lower index of about 2.1, and is transparent throughout the near infrared and visible. Waveguide 68 also contains dielectric cladding layers on either side of the core. Waveguide 68 is a solid immersion lens if the cladding layer has a lower refractive index than the core layer. Waveguide 68 is a solid immersion mirror if the cladding layer has a higher refractive index than the core layer. Preferably, the difference in refractive index between core and cladding should be as large as possible. Air is a suitable dielectric for one side of the cladding for a solid immersion lens. Other dielectrics that can be used for cladding layers for SILs include $SiO_2$ with an index of 1.5 and $Al_2O_3$ with an index of refraction of about 1.8.

One class of near field transducers comprises two and three dimensional metallic shapes in the form of pins, disc/pin, sphere/pin, as well as "C" shape, "L" shape, and "bowtie" shape apertures in metallic films. These structures resonate when irradiated with properly designed incident electromagnetic radiation, whereby the resulting surface plasmons generated can illuminate minute areas of proximate surfaces with intense radiation. Generally, the structures are metallic shapes in an insulating environment. Planar NFTs are shaped metallic films with or without apertures depending on the orientation of the transducer with respect to the incident radiation.

Another type of a near field transducer is a reverse near field transducers which comprise dielectric shapes in a metal matrix. When a reverse NFT is irradiated with the proper electromagnetic energy, surface plasmons are generated at the metal/dielectric interface at the boundaries of the structure.

Figure 4:
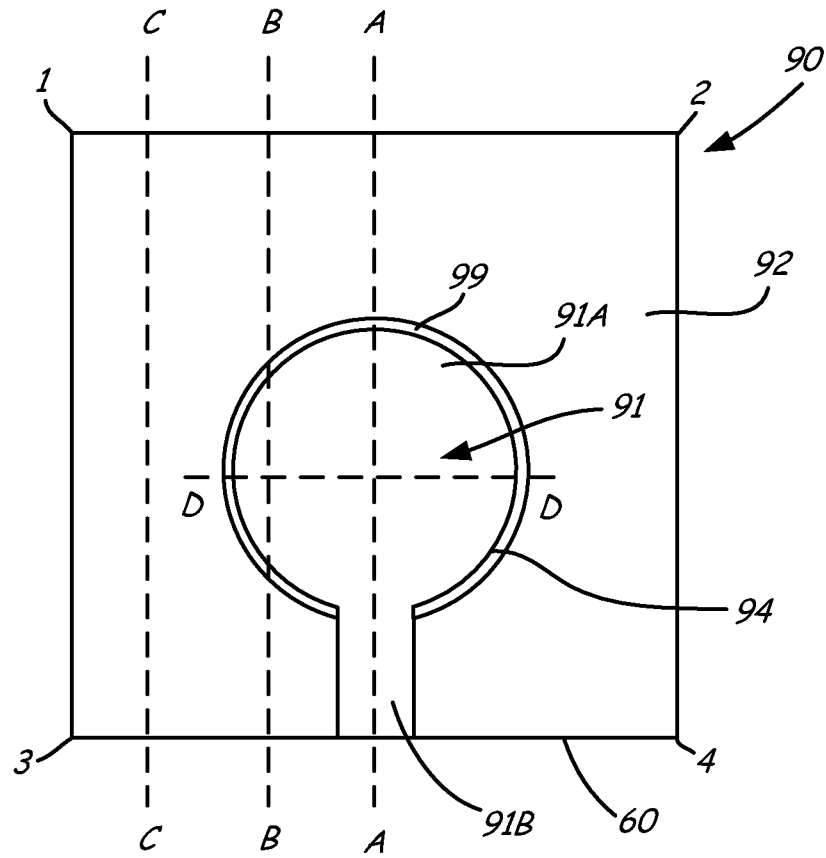
FIG. 4 is a schematic representation of the top view of an apparatus.
Figure 5A:
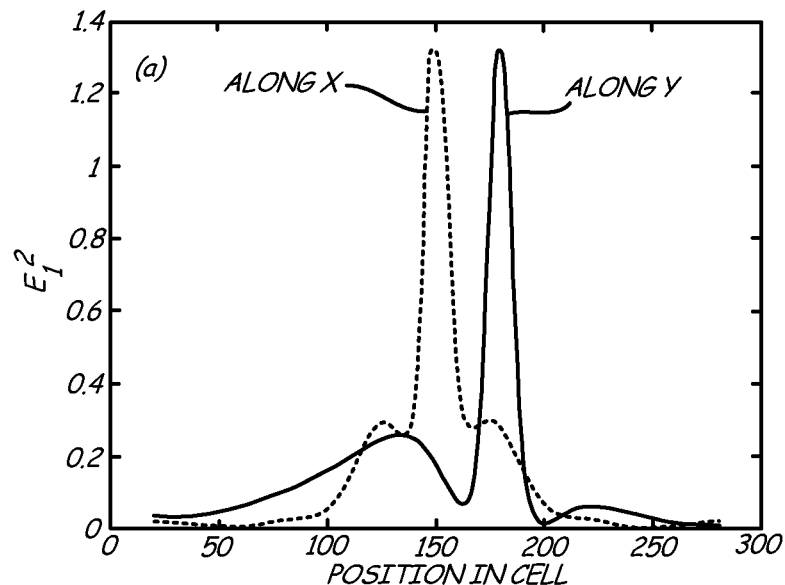
FIG. 5A is a graph showing calculated optical near field intensity along two perpendicular directions at the ABS for the near field transducer shown in FIG. 4 without a slope at an edge.
Figure 5B:
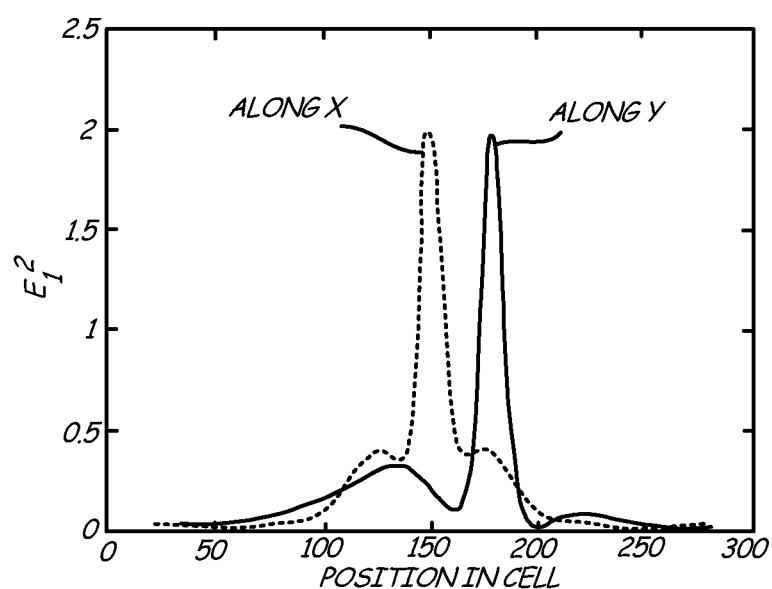
FIG. 5B is a graph showing calculated optical near field intensity along two perpendicular directions at the ABS for the transducer shown in FIG. 4 with a slope at an edge.

FIG. 4 shows reverse NFT 90 comprising near field transducer cavity 91 that is separated from metal/ceramic structure 92 by boundary 94. NFT cavity 91 has a "lollipop" shape comprising disc shaped body 91A connected to rectangular channel 91B that terminates at ABS 60. NFT cavity 91 has boundary 94 coated with ceramic such that the boundary is a ceramic structure surrounded by metal. Modeling and experimental data have shown that the coupling efficiency of the lollipop reverse NFT is higher leading to better resolution of the evanescent radiation emitting from rectangular channel 91B at the bottom of the lollipop.

During operation, incident electromagnetic radiation impinging on metallic/ceramic structure 92 of reverse NFT 90 couples with the metal. The coupled radiation sets up surface plasmons at the edges of the metal/ceramic interface at outer wall 94 of the disc shaped cavity. The plasmons propagate down wall 94 until they meet rectangular channel 91B (i.e. the "pin") and are emitted as focused evanescent radiation at the end of the "pin" at ABS 60. A benefit of the reverse NFT is that write pole material can be deposited in the NFT cavity to increase the magnetic field intensity during writing proximate the ABS at the bottom of lollipop reverse NFT 90. The inventive disclosure of the present invention concerns beveling the edges of the ceramic layer at boundaries such as boundary 94 to increase the magnetic field intensity during writing by minimizing the restriction to magnetic flux offered by the edges of reverse NFT cavity boundary 94.

FIGS. 5A and 5B are plots showing calculated optical near field intensity values along two perpendicular directions at the ABS for two near field transducers. FIG. 5A shows the optical near field intensity for a near field transducer structure shown in FIG. 4 without a bevel slope at edge 94. FIG. 5B shows the optical near field intensity for an optical near field transducer structure shown in FIG. 4 with a bevel slope at edge 94. Comparison of the two figures indicates that the addition of a bevel slope does not degrade the optical near field intensity. In FIGS. 5A and 5B, E is a measure of the electric field of the electromagnetic radiation emanating from reverse NFT 90. It is significant that changing the internal structure of a reverse NFT does not degrade the intensity of the focused near field radiation emanating from the NFT. The structure can be modified to improve the magnetic write field at no expense to the optical field intensity.

The particular form of NFT described in the specification is a reverse NFT with beveled edges and a ceramic coating to enhance flux density during writing by a writer pole deposited on the NFT. It should be noted that the invention also applies to other metal/ceramic NFT structures comprising metal shapes with a ceramic coating with beveled edges to enhance flux density from a writer pole deposited on the NFT. Examples of such NFT structures include pins, disc/pin, sphere/pin, and "C", "K", and "bow tie" shape apertures in metal films.

Figure 6:
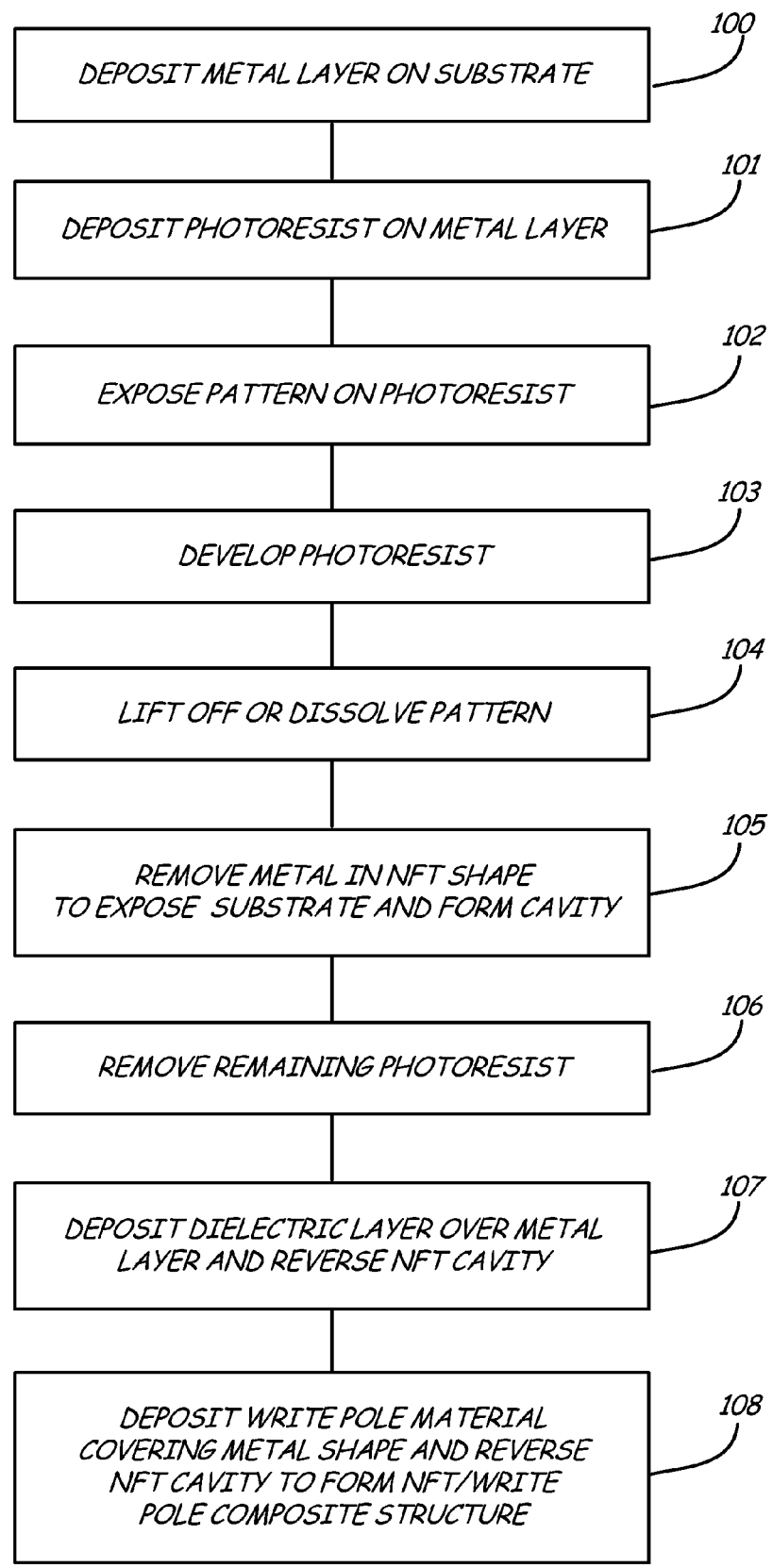
FIG. 6 is a flow diagram showing the steps necessary to form NFT write pole composite structure.

A schematic showing the processing steps necessary to fabricate the embodiment shown in FIG. 4 is given in FIG. 6 and illustrated in FIGS. 7A-7D. The first step to form reverse NFT 90 containing NFT cavity 91 is to deposit a metal layer 93 on substrate 98 in an area indicated by corners 1, 2, 3 and 4 and designated metal area 1234 (Step 100). The metal can be gold, silver, aluminum or other metals. The "lollipop" near field transducer shape of cavity 91 is then defined by the following processes. Metal area 1234 is first covered with photoresist (step 101). Next a pattern in the shape of NFT cavity 91 is formed on the photoresist by standard photolithographic techniques (step 102). The photoresist is then developed (step 103). In positive photolithography the image is then removed by liftoff or dissolution to expose the underlying metal (step 104). The exposed metal is then removed by chemical etching, reactive ion beam etching or other techniques known in the art to form cavity 91 in metal area 1234 defined by boundary 94 (step 105). The remaining resist is then removed (step 106). Dielectric layer 96 is then deposited over metal shape 1234 and NFT cavity 91 (step 107) to form reverse NFT 90. Preferably dielectric layer 96 is $Al_2O_3$ but other dielectric layers such as MgO and $SiO_2$ known in the art can be used. Dielectric layer 96 is preferably 10 nm to 100 nm thick and is preferably deposited by atomic layer deposition (ALD) to form a uniform and homogeneous coating. The final step in integrating reverse near field transducer 90 into the recording head is to deposit write pole material covering metal shape 92 and NFT cavity 91 to form write pole 44 (step 108).

FIGS. 7A-7C show schematic cross sections of metal/ceramic composite 92 and an embodiment of reverse NFT 90 containing NFT cavity 91 along sections AA, BB, and CC, respectively, as shown in FIG. 4. FIG. 7A shows a cross section through the center of NFT cavity 91. The bottom of FIG. 7A is air bearing surface (ABS) 60. FIG. 7A shows substrate 98, metal layer 93, and dielectric layer 96. Bevel 99 breaks previous corner 97 of edge 94 (shown as dotted line) from a sharp edge to a beveled edge. Bevel 99 is indicated in FIG. 4.

FIG. 7B shows section BB through NFT cavity 91, again showing substrate 98, metal layer 93 and dielectric layer 96. Bevel 99 is shown at corner 97 of edge 94. FIGS. 7A and 7B show the depression formed by NFT cavity 91.

FIG. 7C shows section CC that does not intersect NFT cavity 91. In section CC, dielectric layer 96 is on metal layer 93, which, in turn, is on substrate 98.

FIG. 7D is a schematic showing cross section BB in FIG. 4 of apparatus 90 after write pole 44 is formed by deposition of magnetic write pole material 112 on area 1234 according to the embodiment shown in FIGS. 7A-7C and step 108 of FIG. 6. Write pole material 112 fills the depression of NFT cavity 91 providing significantly more magnetic material to write pole 44 proximate ABS 60, which increases the magnetic flux available for writing. As a result of bevels 99, the beveled corners decrease the resistance to the passage of magnetic flux in the write head portion of the magnetic circuit proximate ABS 60. Modeling has shown that the addition of bevel 99 assists in writing by increasing the write field intensity at ABS 60. Although three different write pole shapes are shown by lines 114, 116, and 118 in FIG. 7D, other shapes, not shown, are possible.

Another aspect of reverse NFT 90 comprising metal/ceramic composite 92 containing NFT cavity 91 along sections AA, BB and CC respectively as shown in FIG. 4 is schematically illustrated in FIGS. 8A-8C. FIG. 8A shows section AA through the center of NFT cavity 91. Substrate 98, metal layer 93, and dielectric layer 96 covering both are shown. Bevel 99 at corner 97 of edge 94 breaks the corner of edge 94.

FIG. 8B shows metal layer 93 on substrate 98 and dielectric layer 96 on both substrate 98 and metal layer 93. In addition to bevel 99, dielectric layer 96 has a bevel 101 extending from edge 94 proximate ABS 60 to a point 103 distal from ABS 60 to, in this case, about diameter DD (see FIG. 4).

FIG. 8C shows cross section CC of this aspect. FIG. 8C shows dielectric layer 96 on metal layer 93, which in turn is on substrate 98. Section CC does not intersect NFT cavity 91, and the bevel features are not apparent in the cross section.

FIG. 8D is a schematic showing cross section BB of apparatus 90 after write pole 44 is formed by deposition of magnetic write pole material 112 on area 1234 according to the embodiment shown in FIGS. 8A-8C and step 108 of FIG. 6. Write pole material 112 fills the depression of NFT cavity 91 providing significantly more magnetic material to write pole 44 proximate ABS 60, which increases the magnetic flux available for writing. This embodiment increases the magnetic flux available for writing due to slopes 101 and 99 which decrease the resistance to the passage of magnetic flux in the write head portion of the magnetic circuit proximate ABS 60. Modeling has shown that the addition of slope 101 in addition to bevel 99, increases the write field intensity at ABS 60. Modeling and experimentation can identify the optimum configuration of bevel 101. Although three different write pole shapes of write pole 99 are shown by lines 114, 116, and 118, other shapes, not shown, are possible.

Figure 9A:
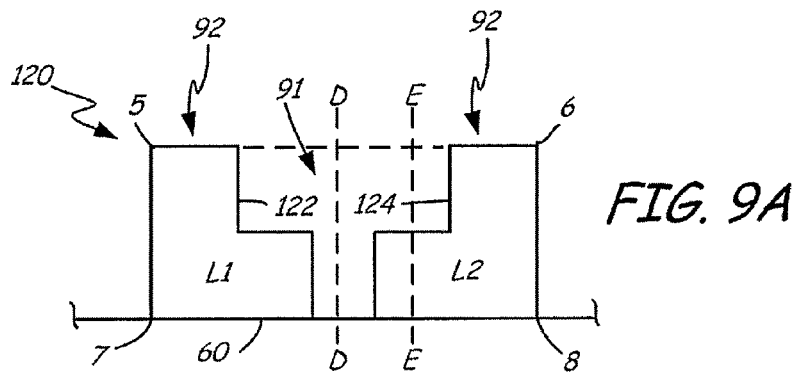
FIG. 9A is a schematic representation of the top view of an apparatus.

A schematic representation of another aspect of the invention is shown in FIG. 9A. FIG. 9A is a top view of reverse near field transducer 120 comprising "L" shaped metal/ceramic composite structures 92 (L1 and L2) and cavity 91 that can be positioned at focal point 86 of wave guide 68 (FIG. 3) to concentrate optical energy towards medium 42. During irradiation, plasmons form at metal/ceramic interfaces 122 and 124 and emerge at the center of NFT 120 as evanescent radiation illuminating a small spot on recording medium 42 proximate ABS 60.

Figures 9B, 9C, 9D, 9E:
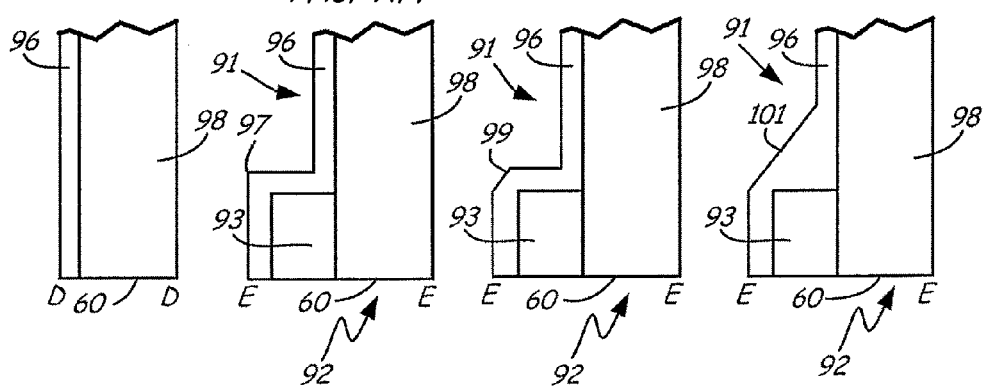
FIG. 9B is a cross sectional view of section DD in FIG. 8A after dielectric deposition.
FIG. 9C is a cross sectional view of section EE in FIG. 8A of a prior art design after dielectric deposition.
FIG. 9D is a cross sectional view of section EE in FIG. 8A after dielectric deposition.
FIG. 9E is a cross sectional view of section EE in FIG. 8A of another embodiment after dielectric deposition.
Figure 9F:
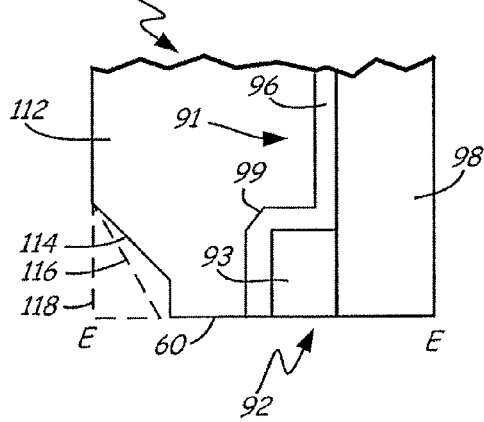
FIG. 9F is a cross sectional view of section EE in FIG. 8D after deposition of write pole material over the dielectric layer and metal NFT shape.
Figure 9G:
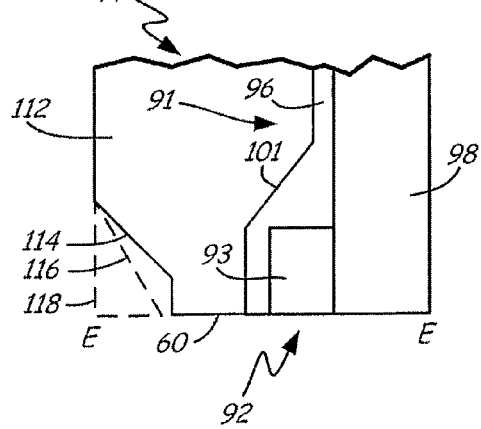
FIG. 9G is a cross sectional view of section EE in FIG. 8F after deposition of write pole material over the dielectric layer and metal NFT shape.
Figure 10:
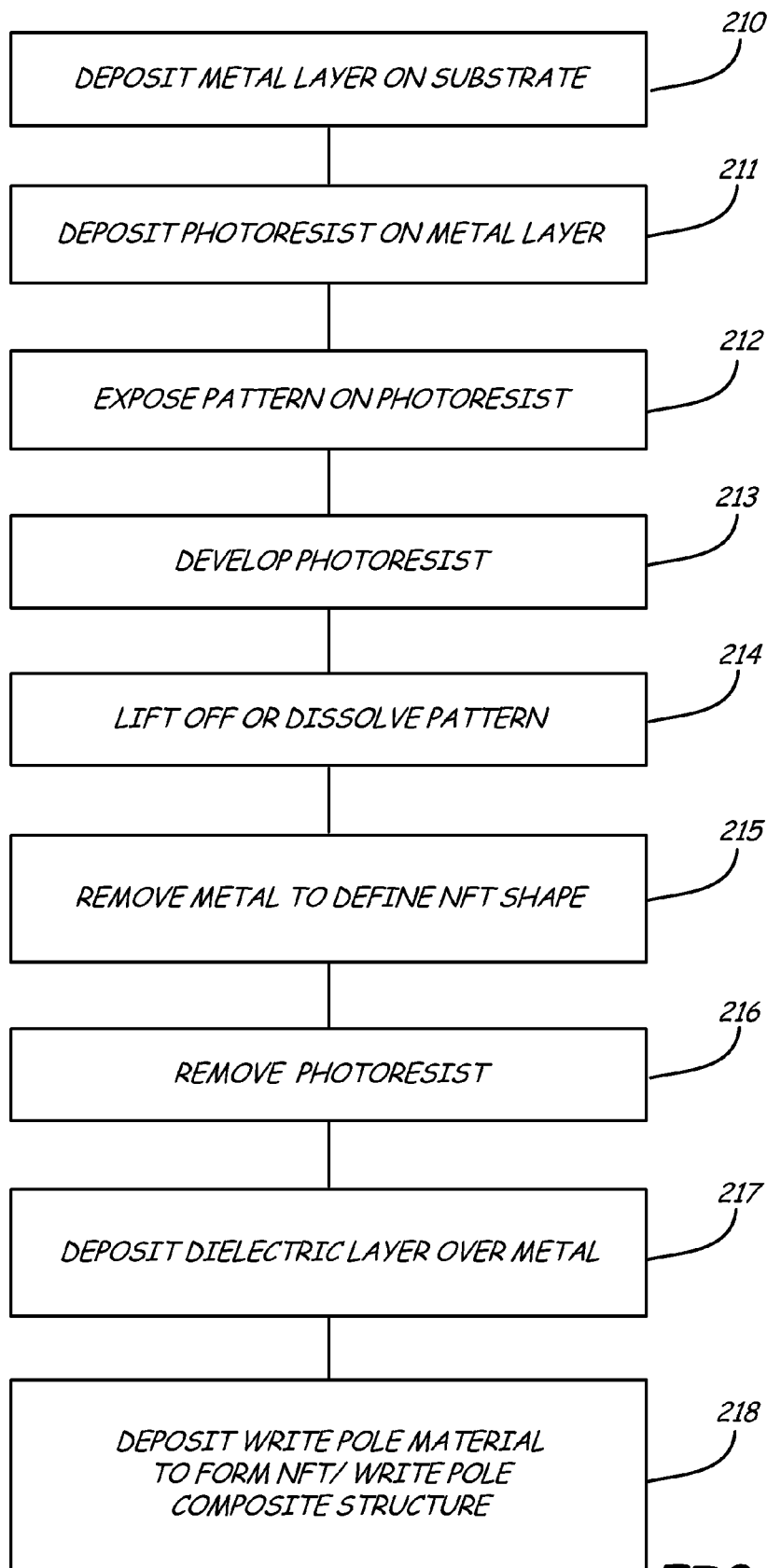
FIG. 10 is a schematic showing the steps necessary to form a reverse near field transducer.

A schematic showing the processing steps to fabricate metal/ceramic composite reverse NFT 120 shown in FIGS. 9A-9G is shown in FIG. 10. The first step to form reverse NFT 120 is to deposit metal layer 93 on substrate 98 in an area indicated by corners 5, 6, 7 and 8 and designated metal area 5678 in FIG. 8A (step 210). The metal can be gold, silver, aluminum or others. Next, "L" shapes 92 (L1 and L2) are formed by photolithographic processes. Metal area 5678 is first covered with photoresist (step 211). A pattern in the shape of shapes L1 and L2 is then formed on the photoresist by standard photolithographic techniques (step 212). The photoresist is then developed (step 213). In positive photolithography the image is then removed by liftoff or dissolution to expose the underlying metal (step 214). The exposed metal is then removed by chemical etching, reactive ion beam etching or other removal techniques known in the art (step 215). The resist is then removed (step 216). Dielectric layer 96 is then deposited over area 5678 to form metal/ceramic reverse NFT 120 (step 217). Preferably dielectric layer 96 is $Al_2O_3$ but other dielectrics such as MgO and $SiO_2$ known in the art can be used. Dielectric layer 96 is preferably 10 nm to 100 nm thick and is preferably deposited by atomic layer deposition (ALD) to form a homogeneous coating. The final step in forming this embodiment is to deposit write pole material 112 over area 5678 containing metal/ceramic composite shapes 92 (L1 and L2) and reverse NFT cavity 91 between them to form the reverse NFT/write pole composite structure 120 (step 218).

FIG. 9B shows cross section DD through the center of reverse NFT 120. FIG. 9B shows dielectric coating 96 on substrate 98 through the center of reverse NFT 120. FIG. 9C shows cross section EE of prior art optical NFT 120 wherein corner 97 of dielectric coating 96 is not beveled. FIG. 9D shows an embodiment in which corner 97 has been relieved to form bevel 99 of dielectric coating 96. In FIG. 9E bevel 101 is formed in dielectric coating 96 to relieve corner 97.

FIG. 9F is a schematic showing cross section EE of reverse NFT 120 after write pole 44 is formed by deposition of write pole material 112 according to the aspect of the invention shown in FIG. 9D. Write pole material 112 fills cavity 91 at the center of inverse NFT 120 and provides increased magnetic material to write pole 44 proximate ABS 60, which increases the magnetic flux available for writing. As a result of bevel 99, the rounded corner decreases the resistance to the passage of magnetic flux in the write head portion of the magnetic circuit proximate ABS 60. Modeling has shown that the addition of bevel 99 assists in writing by increasing the write field intensity. Although three different write pole shapes are shown by lines 114, 116 and 118 in FIG. 9F, other shapes, not shown, are possible.

FIG. 9G is a schematic showing cross section EE of reverse NFT 120 after deposition of write pole material 112 according to the aspect shown in FIG. 9E. Write pole material 112 fills cavity 91 at the center of reverse NFT 120 and provides increased magnetic material to write pole 44 proximate ABS 60 which increases the magnetic flux available for writing. As a result of bevel 101, the slope decreases the resistance to the passage of magnetic flux in the write head portion of the magnetic circuit proximate ABS 60. Modeling has shown that the addition of bevels 99 and 101 assist in writing by increasing the write field intensity. Modeling and experimentation can identify the optimum configuration of bevel 101. Although three different write pole shapes are shown by lines 114, 116 and 118 in FIGS. 9F and 9G, other shapes, not shown, are possible.

A schematic representation of another aspect is shown in FIG. 11A. FIG. 11A is a top view of reverse near field transducer 140 comprising triangular shaped metal/ceramic composite structures 92 (T1 and T2) that can be positioned at focal point 86 of wave guide 68 to concentrate optical energy towards medium 42. During irradiation, plasmons form at metal/ceramic interfaces 126 and 128 and emerge at the center of NFT 140 as evanescent radiation illuminating a small spot on recording medium 42 proximate ABS 60.

A schematic showing the processing steps necessary to fabricate the embodiment shown in FIGS. 11A to 11G is given in FIG. 10. The first step to form reverse NFT 140 is to deposit metal layer 93 on substrate 98 in an area indicated by corners 1', 2', 3' and 4' and designated metal area 1'2'3'4' in FIG. 11A (step 210). The metal can be gold, silver, aluminum or others. Next, triangular metal shapes 92 (T1 and T2) are formed by photolithographic processes. Metal area 1'2'3'4' is first covered with photoresist (step 211). A pattern in the shape of metal shapes T1 and T2 is then formed on the photoresist by standard photolithographic techniques (step 212). The photoresist is then developed (step 213). In positive photolithography the image is then removed by liftoff or dissolution to expose the underlying metal (step 214). The exposed metal is then removed by chemical etching, reactive ion beam etching or other techniques known in the art (step 215). The resist is then removed (step 216). Dielectric layer 96 is then deposited over area 1'2'3'4' (step 217). Preferably dielectric layer 96 is $Al_2O_3$ but other dielectrics such as MgO, $SiO_2$ can be used. Dielectric layer 96 is preferably about 10 nm to about 100 nm thick and is preferably deposited by atomic layer deposition (ALD) to form a homogeneous coating. The final step in forming this aspect is to deposit write pole material 112 over area 1'2'3'4' containing metal ceramic composite shapes 92 (T1 and T2) and NFT cavity 91 between them to form inverse NFT 140/write pole 44 composite structure (step 218).

FIG. 11B shows cross section GG through the center of NFT 140. FIG. 11B shows dielectric coating 96 on substrate 98 through the center of NFT cavity 91. FIG. 11C shows cross section HH of prior art NFT 140 wherein corner 97 of dielectric coating is not beveled. FIG. 11D shows an embodiment in which corner 97 has been relieved to form bevel 99 of dielectric coating 96. In FIG. 11E, bevel 101 is formed in dielectric coating 96 to relieve corner 97.

FIG. 11F is a schematic showing cross section HH of reverse NFT 140 after deposition of write pole material 112 according to the aspect of the invention shown in FIG. 11D. Write pole material 112 fills the region at the center of reverse NFT 140 and provides increased magnetic material to the write pole 44 proximate ABS 60 which increases the magnetic flux available for writing. As a result of bevel 99, the rounded corner decreases the resistance to the passage of magnetic flux in the write head portion of the magnetic circuit proximate ABS 60 which increases the magnetic flux available for writing. Modeling has shown that the addition of bevel 99 assists in writing by increasing the write field intensity.

FIG. 11G is a schematic showing crossection HH of reverse NFT 140 after deposition of write pole material 112 according to the aspect shown in FIG. 11E. Write pole material 112 fills cavity 91 at the center of reverse NFT 140 and provides increased magnetic material to write pole 44 proximate ABS 60 which increases the magnetic flux available for writing. As a result of bevel 101, the slope decreases the resistance to the passage of magnetic flux in the write head portion of the magnetic circuit proximate ABS 60. Modeling has shown that the addition of bevels 99 and 101 assist in writing by increasing the write field intensity. Three different shapes of write pole 44 are shown by lines 114, 116 and 118 in FIGS. 11F and 11G. The profiles shown by lines 114, 116 and 118 in FIGS. 11F and 11G are not to be taken as limiting. Other profiles, not shown, are possible in other aspects of the invention.

Although the present invention has been described with reference to preferred embodiments, workers skilled in the art will recognize that changes may be made in form and detail without departing from the scope of the invention. The implementations described above and other implementations are within the scope of the following claims.

The invention claimed is:

1. A magnetic recording head comprising:
a write pole having a write pole tip adjacent to an air bearing surface;
a near field transducer positioned adjacent the write pole tip and configured to heat a portion of a magnetic storage medium; and
an insulator layer between the near field transducer and the write pole, the insulator layer having a beveled edge over a discontinuity in the near field transducer.

2. The magnetic recording head of claim 1, wherein the near field transducer comprises a metal film having a cavity connected to a channel that extends from the cavity to the air bearing surface.

3. The magnetic recording head of claim 2, wherein the near field transducer comprises a lollipop shape.

4. The magnetic recording head of claim 2, wherein the near field transducer comprises a pair of "L" shapes separated by a distance.

5. The magnetic recording head of claim 2, wherein the near field transducer comprises a pair of triangular shapes separated by a distance.

6. The magnetic recording head of claim 2, wherein the metal film is at least one of gold, silver, or aluminum.

7. The magnetic recording head of claim 2, wherein the insulator layer is concentrated in certain areas of the near field transducer to improve internal bevel structures.

8. The magnetic recording head of claim 1, wherein the insulator layer is at least one of aluminum oxide, magnesium oxide, or silicon dioxide.

9. The magnetic recording head of claim 1, and further comprising:
means for coupling electromagnetic radiation to the near field transducer.

10. The magnetic recording head of claim 9, wherein the means for coupling electromagnetic radiation to the near field transducer comprises at least one of a parabolic solid immersion mirror, a parabolic solid immersion lens, and a tapered waveguide.

11. A magnetic transducer comprising:
a near field transducer that couples with incident electromagnetic radiation to produce surface plasmons;
an insulator layer over the near field transducer and having a beveled edge over a discontinuity in the near field transducer; and
a write pole over the insulator layer, the write pole having a write pole tip adjacent an air bearing surface and the near field transducer.

12. The magnetic transducer of claim 11, wherein the near field transducer comprises a shaped metal layer including at least one of gold, silver, and aluminum.

13. The magnetic transducer of claim 11, wherein the insulator layer comprises at least one of aluminum oxide, magnesium oxide, and silicon dioxide.

14. The magnetic transducer of claim 11, and further comprising a waveguide for coupling electromagnetic radiation with the near field transducer.

15. The magnetic transducer of claim 14, wherein the waveguide comprises at least one of a parabolic solid immersion mirror, a parabolic solid immersion lens, and a tapered waveguide.

16. The magnetic transducer of claim 11, wherein the insulator layer is formed by at least one of atomic layer deposition, ion beam deposition, and physical vapor deposition.

17. A magnetic transducer comprising:
a near field transducer with a shaped cavity having an outer edge comprising at least one right angle corner and a concentrating portion that extends to an air bearing surface;
an insulating layer over the near field transducer and having a beveled edge over the at least one right angle corner of the outer edge of the near field transducer; and
a write pole over the insulating layer, the write pole having a write pole tip adjacent the air bearing surface and the near field transducer.

18. The magnetic transducer of claim 17, wherein the near field transducer comprises a shaped metal layer that couples with incident electromagnetic radiation.

19. The magnetic transducer of claim 18, wherein the shaped metal layer comprises at least one of gold, silver, and aluminum.

20. The magnetic transducer of claim 17, wherein the insulating layer comprises at least one of aluminum oxide, magnesium oxide, and silicon dioxide.

* * * * *